July 10, 1945.  W. H. HARRISON  2,380,173
HARVESTER REEL
Filed June 28, 1943  2 Sheets-Sheet 1
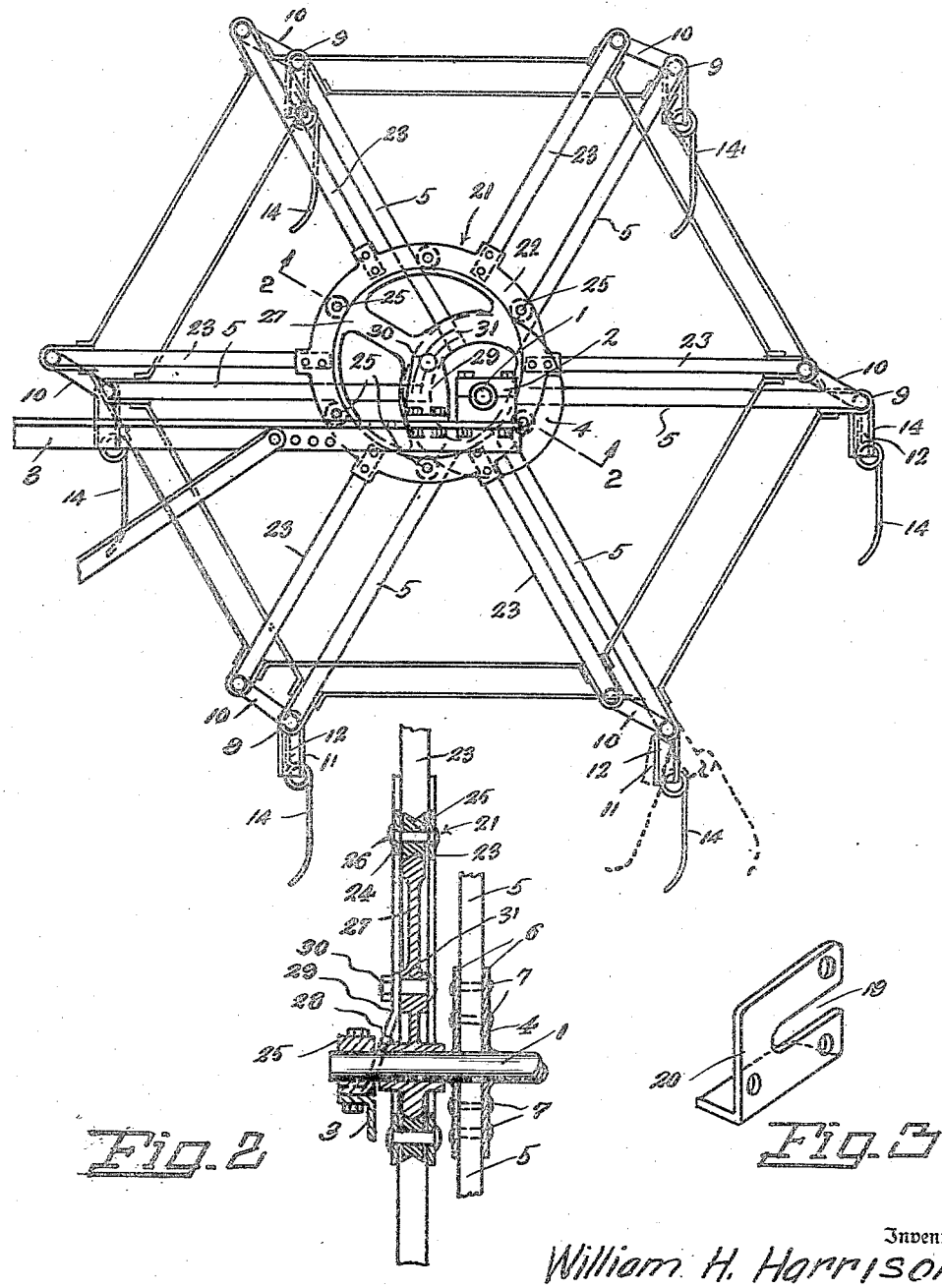
Inventor
William H. Harrison
By
Glenn L. Fish
Attorney

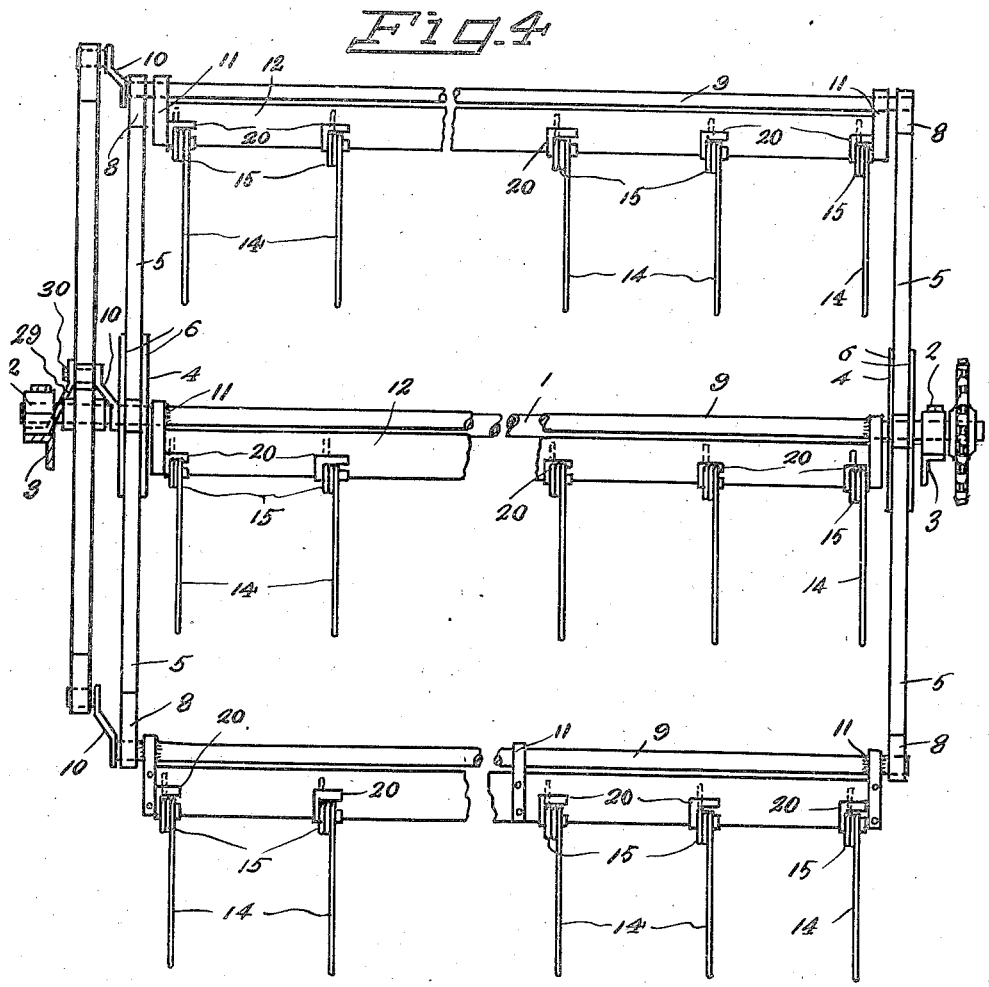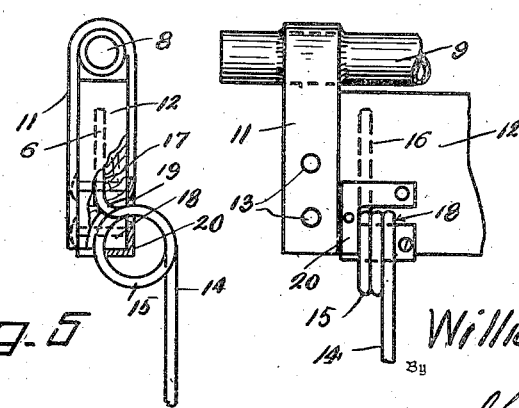

Patented July 10, 1945

2,380,173

UNITED STATES PATENT OFFICE 2,380,173

HARVESTER REEL

William H. Harrison, Spokane, Wash.

Application June 28, 1943, Serial No. 492,565

3 Claims. (Cl. 56—226)

This invention relates to a harvester reel and it is one object of the invention to provide a reel having bats so mounted that they may be swung about pivots as the reel turns and thus maintained in vertical position so that they may enter grain to be cut and press the grain against the cutter of the harvester without the grain being bent over and flattened by action of the bats and tines carried thereby.

Another object of the invention is to provide a reel wherein the bats are pivotally carried by cross bars mounted between spokes of the reel, the cross bars being rocker shafts having crank arms pivoted to arms of a spider which fits loosely about an eccentric and causes the bats to be gradually turned and maintained in the vertical position as the reel turns.

Another object of the invention is to provide the reel with a spider fitting about an eccentric so mounted that it may be shifted to adjusted positions and thus control the angular relation of the bats and their tines to the periphery of the reel.

Another object of the invention is to provide the bats with tines so mounted that they will be firmly held in place and of such formation that they may lift grain which has been flattened by wind or hard rain and also lift vines into position for cutting during turning of the reel.

Another object of the invention is to provide a reel which is simple in construction, efficient in operation, and not liable to become broken or get out of order when in use.

In the accompanying drawings:

Fig. 1 is a side view of the improved reel.

Fig. 2 is a sectional view on the line 2—2 of Figure 1.

Fig. 3 is a perspective view of a clip for holding a tine to a bat.

Fig. 4 is a front elevation of the improved reel.

Fig. 5 is an end view of a bat with a portion in section.

Fig. 6 is a side view of an end portion of a bat and the cross bar carrying the bat.

The improved reel constituting the subject matter of this invention constitutes an element of a harvester and is mounted at the front of the harvester in position for engaging grain, vines and the like, and pressing same into engagement with a cutter and down upon a conveyor at the rear of the cutter as the harvester is moved across a field.

The harvester is of conventional construction and the reel has a shaft 1 rotatably mounted in bearings 2 carried by supporting bars 3 forming part of or carried by the frame of the harvester. Hubs 4 formed of metal discs are carried by the shaft and these hubs carry spokes 5 which are firmly secured between the hub-forming discs 6 by headed pins or bolts 7. The hubs 4 and spokes 5 form heads for the reel. The spokes or arms 5 may be of any length desired and, at their outer ends, carry bearings 8 to rotatably mount rocker shafts 9. The shafts or cross bars are preferably formed of metal tubes and each is provided at one end with a crank arm 10. To the rocker shaft 9 are welded U-shaped straps 11 which straddle bats 12 and are secured to the bats by bolts 13. By so mounting the bats, they may have swinging movement imparted thereto and maintained in depending relation to the cross bars during rotation of the reel.

The bats, which are formed of wood, carry tines 14 formed from strands of resilient wire and, referring to Figs. 5 and 6, it will be seen that the strand from which such tine is formed is coiled to form a spring 15 having a shank 16 extending therefrom. The shank fits tightly into a socket 17 formed in the bat and the spring fits into a recess 18 with a portion passing through space 19 between arms of a clip 20. Since a portion of the clip or bracket passes through the coiled spring, the tine will be firmly held in place and parallel to the plane of the bat to which the clip is secured. The tine is straight throughout the major portion of its length and terminates in a curved free end portion. Therefore, when vines are being cut, the tines may lift the vines and, together with the bats, press the vines against the cutter and onto a conveyor back of the cutter, without the vines clinging to the tines and being carried upwardly with the reel.

The bats and their tines are to be maintained in vertical position at all times during rotation of the reel, and to accomplish this, there has been provided a spider 21 having a central ring 22 carrying arms 23 which project radially therefrom. The central ring consists of circular discs 24 between which rollers 25 are rotatably mounted upon pins 26, and the rollers have their peripheral edge faces V-shaped in cross section to fit upon the peripheral edge face of a circular eccentric 27. This eccentric is formed with a sleeve 28 to receive the drive shaft 1, and by turning the eccentric about the shaft to adjusted positions, the bats and their tines may be angularly adjusted with respect to the arms or spokes of the reel. Since the rollers have their peripheral edges V-shaped in cross section, they cannot slip transversely out of engagement with the eccentric. A bracket 29 is mounted on the supporting bar 3 adjoining which the sleeve 28 is disposed, and carries a bolt 30 which passes through a slot 31 formed through the eccentric. The slot is arcuate and concentric to the shaft 1 as shown in Fig. 1, and when the nut of the bolt is loosened, the eccentric 27 may be turned about the shaft to angularly adjust the bats, as indicated by dotted lines in Fig. 1. The bolt will then be tightened and the eccentric held stationary. Since the eccentric is stationary, and the spider turns about it during rotation of the reel, the arms 23 of the spider, which are pivoted to the crank arms 10 of the rocker shafts, cause the rocker shafts to be turned and the bats held in the same angular relation to the periphery of the reel at all points throughout the circumference thereof. Therefore, the bats will enter standing grain or other vegetation in such a manner that the grain will be fed to the cutter of the harvester and onto the conveyor thereof in a very efficient manner.

Having thus described the invention, what is claimed is:

1. In a harvester reel, a rotary drive shaft, hubs carried by said shaft, spokes extending radially from said hubs, rocker shafts carried by said spokes, bats connected with said rocker shafts and suspended therefrom, crank arms for said rocker shafts, a ring eccentrically mounted on said drive shaft and movable about the same to adjusted positions, a spider rotatably mounted about said ring and having radiating arms pivoted at their outer ends to the crank arms for turning the rocker shafts and maintaining the bats substantially vertical during rotation of the reel, said spider consisting of spaced discs and rollers rotatably mounted between the discs, the rollers having their peripheral edge faces V-shaped in cross section and engaging a similarly shaped edge face of the eccentric ring to prevent the rollers from slipping out of engagement with the eccentric ring, and means for releasably securing the eccentric ring in a set position.

2. In a harvester reel, a rotary drive shaft, heads for the reel carried by said drive shaft, rocker shafts extending longitudinally of the reel and carried by said heads, bats suspended from said rocker shafts, tines spaced from each other longitudinally of said bats, an eccentric mounted about said shaft adjacent an end of the reel, and a spider rotatably mounted about said eccentric and connected with the rocker shafts to turn the rocker shafts and maintain the bats and their tines substantially vertical during rotation of the reel, and members rotatably carried by said spider and having interfitting engagement with the eccentric to prevent same from moving out of engagement with the eccentric.

3. In a harvester reel, a rotary drive shaft, heads carried by said shaft, rocker shafts extending longitudinally of the reel and carried by said heads, bats carried by said rocker shafts and suspended therefrom, crank arms for said rocker shafts, an eccentric about said shaft mounted for turning movement to adjusted positions, a spider about said eccentric including a ring and arms extending therefrom and pivoted to the crank arms, rollers rotatably carried by said ring and having their edge faces grooved and engaging a conforming edge face of the eccentric to prevent the rollers from slipping out of engagement with the eccentric, and means for securing the eccentric in a set position.

WILLIAM H. HARRISON.